United States Patent Office 3,411,850
Patented Nov. 19, 1968

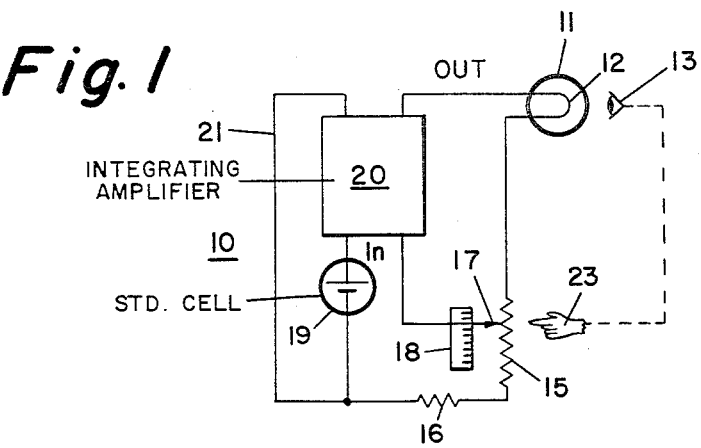
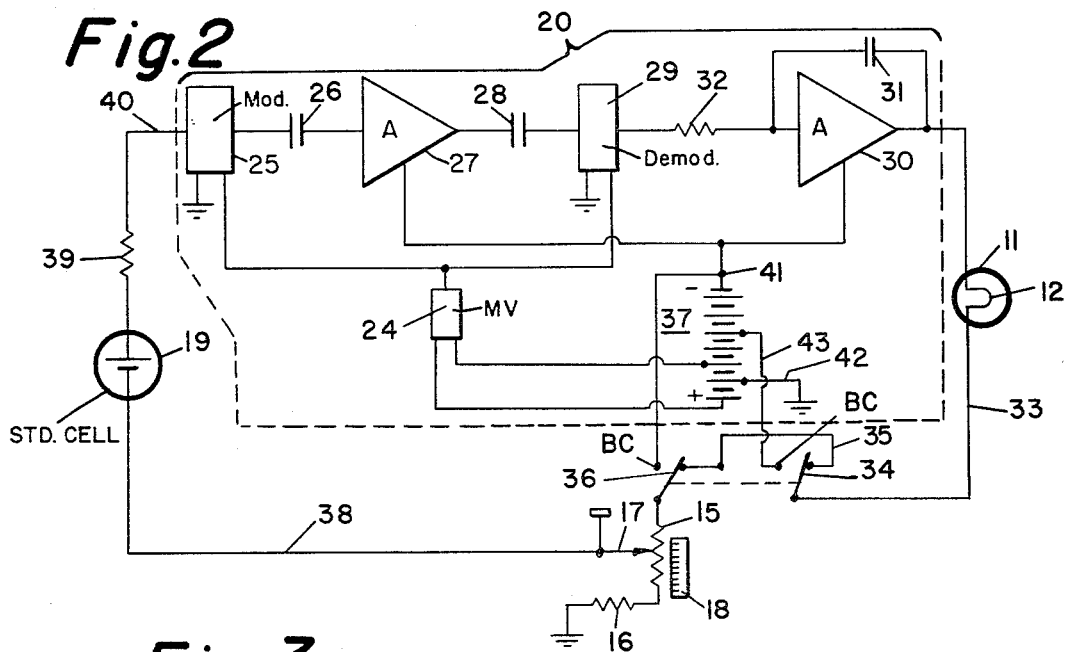
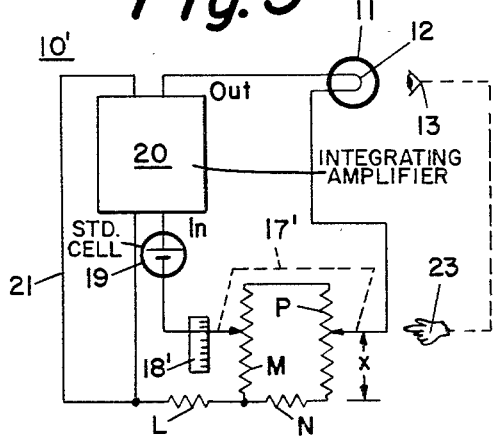
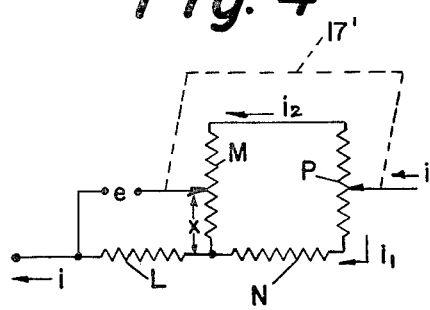

3,411,850
ELECTRONIC RADIANT ENERGY PYROMETERS
Albert J. Williams, Jr., Philadelphia, and William T. Gray, Jenkintown, Pa., assignors to Leeds & Northrup Company, a corporation of Pennsylvania
Filed Mar. 5, 1962, Ser. No. 177,380
5 Claims. (Cl. 356—50)

This invention relates to electronic radiant energy pyrometers and has for an object the provision of radiant energy pyrometers with electronic balance. The invention is particularly related to electronic pyrometers of the optical type which enable temperatures to be measured by a single adjustment using potentiometric measurement of lamp current.

Heretofore one of the most commonly used commercial forms of optical pyrometer has been the type utilizing a filament of known of brightness-temperature versus current characteristic, such as disclosed in U.S. Letters Patent 2,252,015—Machler. That optical pyrometer included a telescope which was sighted by an observer upon the object whose temperature was to be measured. The operator adjusted the optical system to bring clearly into focus the filament of the lamp within the telescope housing and also to bring the image of the target under observation into the plane of the filament which was usually flat or in the form of a very small ribbon with its flat surface normal to the direction of vision or optical axis of the telescope. The operator then adjusted the current through the filament of the lamp until the filament was not distinguishable in brilliance or brightness from that of the hot body under observation. To effect this optical match, the operator closed a switch completing a circuit comprising the filament battery, the filament rheostat, a potentiometer comprising a slidewire and an end-coil resistance in series therewith, and a resistance in shunt with the slidewire, and the necessary connections between these elements and the lamp. The brightness of the lamp filament was varied by adjustment of the filament rheostate which introduced more or less resistance in circuit in series with the filament to decrease or increase its brightness.

When the foregoing optical balance or match had been made there existed between the terminal of the end-coil resistance and a point on the potentiometer slidewire a difference of potential or voltage drop which was equal to the electromotive force produced by a standard cell. The temperature of the observed object or target was determined after the optical match by adjusting a voltage dividing contact along the potentiometer slidewire until the contact rested on the above-mentioned point of the potentiometer slidewire. The achievement of this adjustment was indicated by the fact that there was no deflection of the galvanometer in circuit with the standard cell which was temporarily connected for balancing purposes. Concurrently with this adjustment, a scale calibrated in temperature was adjusted relative to an index and when the galvanometer read zero, the temperature was read directly from the scale. From the foregoing description, it will be seen that two independent adjustments which must be performed in sequence are required to obtain a temperature reading with that type of pyrometer.

The present invention enables an operator to obtain a temperature measurement more quickly and by means of a single adjustment while retaining the precise determination of the temperature by use of a standard cell and an adjustable potentiometer. Another feature of the present invention is the use of a plurality of resistors in a novel circuit arrangement wherein the relation between temperature and distance along the scale may be linear. For example, the scale may be linear in temperature permitting the use of vernier reading and this linear relation may be obtained regardless of the variations in the above-mentioned lamp characteristics. Also, the scale may be linear in mireds (a mired is one-millionth of a reciprocal-degree Kelvin). A scale in mireds is particularly useful. If the scale is linear in mireds then a correction may be made for the transmission of a screen, the reflection of a mirror used in the optical system between the filament and the object to be measured, or the emissivity of the object itself, or any combination of these effects provided they are known, by the simple process of subtracting the equivalent correction in mireds from the apparent mired reading to get the true mired reading.

In accordance with one aspect of the invention there is provided a system for measuring the temperature of a body having a variable condition related to its temperature. This system includes a source of a corresponding reference condition for producing a variable reference condition related to an electric signal applied thereto. A variable transducer is connected in circuit with the reference condition source for producing an output signal related to both the electrical signal applied to the reference condition source and the extent of adjustment of the transducer. The system further includes a source of standard electrical signal and means responsive to the difference between the output signal from the transducer and the standard electrical signal for varying the electrical signal applied to the reference condition source for maintaining equality between the standard signal and the output signal, and means for adjusting the transducer to produce equality between the variable condition and the reference condition whereby the adjustment of the transducer is a measure of the temperature of the body.

In accordance with the further aspect of the invention there is provided an optical pyrometer system for measuring the temperature of a body including a variable brightness standard for producing a brightness related to the electric current flow therethrough and adjustable calibrated potentiometeric means connected in circuit with the standard and adapted to produce an electrical output signal related to the electric current flow therethrough and to the setting of the potentiomeric means. The system further includes a source of standard electrical signal and means responsive to the difference between the standard signal and the signal output from the potentiometric means for producing a current flow through the variable brightness standard to maintain the signal difference substantially at zero. The system further includes means for adjusting the potentiometric means until the brightness of the standard and the body are equal whereby the temperature of the body is indicated by the setting of the potentiometric means.

In accordance with a further aspect of the invention, there is provided in an optical pyrometer system the sub-combination comprising a quadratic resistance network. The network may comprise a first potentiometer resistance and contact movable relative thereto and a second potentiometer resistance and contact movable relative thereto. The potentiometer resistances may be directly connected at one end thereof with a first resistance interconnecting the opposite ends of the potentiometer resistance to form a closed loop. A second resistance is connected at one end thereof to a junction between the first resistance and the second potentiometer resistance. There is provided means for simultaneously adjusting the contacts of the potentiometer in the same direction relative to the common connection of the potentiometer resistance with the quadratic network having a flow of current therethrough between the movable contact of one of the potentiometer resistances and the other end of the second resistance. There is also included means for providing the proper current through the network to maintain a constant voltage between the other end of the second resistance and the contact of the other potentiometer resistance.

For a more detailed disclosure of the invention and for further objects and advantages thereof reference is to be had to the following description taken in conjunction with the accompanying drawings in which:

FIG. 1 is a simplified diagram illustrating one embodiment of the invention;

FIG. 2 is a schematic diagram illustrating further electrical features of the embodiment in FIG. 1;

FIG. 3 is a simplified diagram illustrating a modification of the invention;

FIG. 4 is a fractional schematic wiring diagram useful in explaining the operation of the modification shown in FIG. 3.

Figure 5:
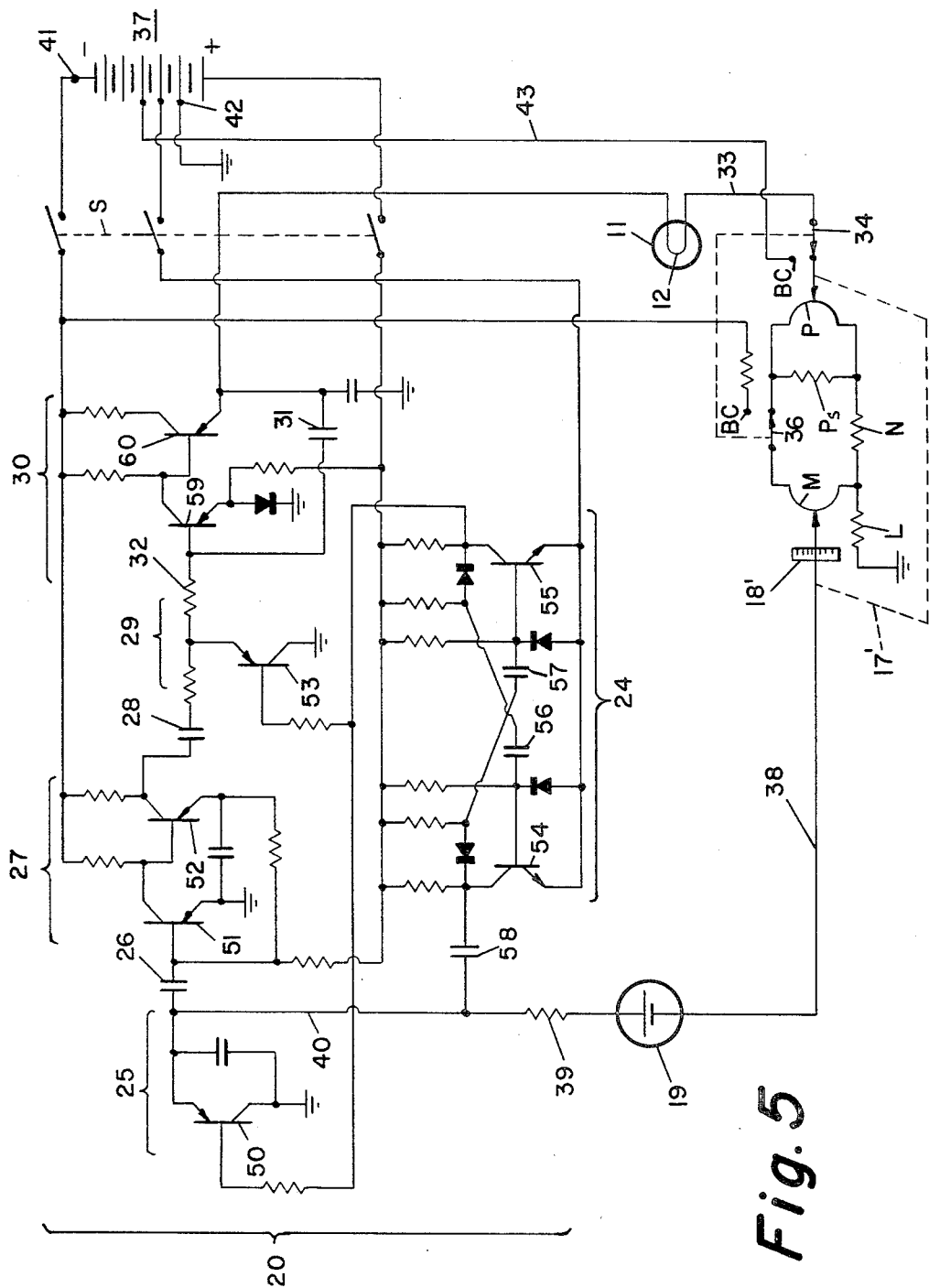
FIG. 5 is a more detailed wiring diagram of the modification shown in FIG. 3.

Referring to FIG. 1, the present invention has been illustrated in connection with an optical pyrometer 10. It is to be understood that the pyrometer includes a telescope (not shown) of conventional type, such for example as illustrated in the aforesaid Patent 2,252,015 and has provision for bringing into focus the filament 12 of lamp 11 and for superimposing the image of the target or hot body whose temperature is to be measured on the filament. The position of the eye of the observer or operator is indicated at 13. The pyrometer 10 includes the lamp 11, the filament 12 of which is in series with the resistance element of a potentiometer 15 and an end-coil resistance 16. The adjustable contact 17 of the potentiometer is illustrated as being movable relative to a scale 18 which is calibrated in units of temperature. A standard cell 19 is connected in a loop circuit with the resistance 16 and the lower portion of the potentiometer resistance 15 forming an input circuit for an integrating and amplifying device 20. The amplifying device 20, as later to be more fully described, is of the electronic type and provides a current output through the filament 12 of lamp 11, through the potentiometer resistance 15, the end-coil resistance 16, and a conductor 21 to the other side of the output circuit of the integrating and amplifying device 20. The device 20, due to its amplification and negative feedback connection from the potentiometer 15, tends to maintain the voltage difference across the input terminals at zero. In order to accomplish this, the voltage across the lower portion of the potentiometer 15 below contact 17 and across the resistance 16 is made equal to the voltage across the standard cell 19. In order to produce this condition of equality, the current through the potentiometer resistance 15 has a different value for each position of the contact 17 and the variation in the current output is obtained by adjustment of the contact. For example, with the contact 17 near the low end of potentiometer resistance 15 there will be required a greater current to produce the voltage in opposition to the standard cell 19 than when the contact is at a higher position on the potentiometer resistance 15.

In making a temperature measurement with the pyrometer 10, the operator places his eye 13 in a position to observe simultaneously the target and filament 12 of the lamp 11. He adjusts the contact 17 of the potentiometer with his hand 23 until the filament 12 is not distinguishable in brightness from that of the target or hot body under observation. By reason of the fixed reation of the brightness-temperature versus current characteristic of the lamp 11, the operator may now read the temperature directly from the scale 18 by the position of the contact 17 relative to the scale 18. From the foregoing it will be seen that while the pyrometer 10 requires only a single adjustment in order to obtain the temperature reading, it still takes advantage of the inherent accuracy obtainable with standard cells by comparing a voltage difference produced in a resistance network by the filament current with the voltage of the standard cell.

Referring to FIG. 2, the electrical circuit of the pyrometer 10 of FIG. 1 has been shown in more detail, particularly with regard to the amplifying device 20. In systems of this type involving amplification of small D.C. signals, the problem of drift is encountered and in order to overcome this problem, it is desirable to use a chopper-type amplifier within the amplifying device 20. The amplifying device 20, as illustrated in FIG. 2, includes a chopper or modulator 25 for converting the D.C. error signal at its input into an A.C. signal which is capacitively coupled by a capacitor 26 to an A.C. amplifier 27. The output from the amplifier 27 is coupled by a capacitor 28 to a demodulator 29 operated in synchronism with the modulator 25. The modulator 25 and the demodulator 29 are maintained in synchronism and powered by a multivibrator 24 which is connected across a portion of a battery 37. An amplifier 30 having a negative feedback capacitor 31 in series with a resistance 32 performs an integrating and filtering action with regard to the square wave pulses produced by the demodulator 29. These pulses are converted and amplified to produce an amplified output current through the filament 12 of lamp 11. The other side of the filament 12 is connected by way of conductor 33 through a switch 34 and conductor 35 to a switch 36 and thence through the potentiometer resistance 15 and end-coil resistance 16 and by way of ground to the ground connection 42 of the battery 37. The movable contact 17 of the potentiometer is connected by way of conductor 38 to one side of the standard cell 19 and the other side of the standard cell 19 is connected by way of a resistor 39 to the modulator or chopper 25. With a circuit of this type, when an error voltage exists between conductor 40 and ground, the amplifying device 20 by virtue of the integrating action of the integrating devices 30–32 will alter the current output to the filament 12 and potentiometer 15 in a direction to reduce the input voltage to zero. Thus it will be seen that the action of the circuit of the optical pyrometer as thus far described in FIG. 2 is the same as that described in connection with FIG. 1. The electrical components of the amplifying device 20 may be of the solid state type, as later to be described in connection with FIG. 5, or they may be of the type described and illustrated in connection with Williams Patent 2,459,730.

The optical pyrometer illustrated in FIG. 2 also includes provision for checking the battery 37. It will be noted that switches 34 and 36 are ganged for concurrent operation. The switches 34 and 36 have been illustrated in FIG. 2 in the position which they occupy for making a temperature measurement. In practice these switches 34, 36 are usually spring-biased into the measuring position. In checking the battery 37, a portion of the battery voltage is compared with the EMF of the standard cell 19. When switches 34 and 36 are moved to their left-hand position into engagement with the battery-checking contacts BC, the portion of the battery between points 41 and 42 will be applied to potentiometer resistance 15 and end-coil resistance 16 to be compared with the EMF of the standard cell. When switch 34 is moved into engagement with its contact BC, the connection 43 is effective to apply a reduced voltage to the amplifier circuit including the filament 12 of lamp 11. This prevents the application of high voltage to the filament 12 of the lamp which might result due to absence of the negative feedback connection around the amplifying device 20. In checking the battery 37, the operator looks at the lamp 11 and adjusts the contact 17 relative to the potentiometer resistance 15. When the contact 17 is adjusted relative to the potentiometer resistance so that the polarity at conductor 40 is of one sign, the lamp 11 will go off and when the contact 17 is adjusted to a different position relative to the potentiometer resistance 15 to produce an opposite polarity at conductor 40, the lamp 11 will go on. The location of the transition point on the scale 18 will depend on the condition of the battery 37. In order to enable the operator to determine when the battery should be renewed, an indication may be provided on the scale 18 as by marking a section of the scale in red. When the transition point is within the red area, this will indicate to the operator that the battery should be renewed. This checking operation is also useful in checking the overall operation of the pyrometer as well as various components of the pyrometer in addition to the battery.

Scales used on pyrometers of the type illustrated in U.S. Patent 2,252,015 are purely empirical having been established by the average performance of a group of lamps calibrated by the National Bureau of Standards. In practice, each lamp is adjusted to the scale at two points, at the high-temperature end by adjusting the relative position of the scale and contact, and at the low end by shunting the potentiometer. This same procedure and scale are used in connection with the pyrometer illustrated in FIG. 1. In many applications it is desirable that the scale be linear, and such is not the case when a linear slidewire 15 is used as in FIG. 1. In FIG. 3, there is illustrated an optical pyrometer 10' in which the simple linear potentiometer slidewire 15 has been replaced by a resistance network in which the relation between filament current and slidewire motion may be made non-linear, while the scale 18' is linear in desired units such as temperature or mireds. In FIG. 3, the various components of the pyrometer 10', which are the same as those in the pyrometer 10 described in connection with FIG. 1, have been provided with corresponding reference characters. It will be noted that the essential difference between the two pyrometers consists of the quadratic resistance network, including resistances L, M, N and P, and the linear scale 18'. The resistances M and P are of the slidewire type and are engaged respectively by contacts which are ganged at 17' for concurrent movement along their respective slidewires M and P. While the contacts have been illustrated as ganged for movement relative to the resistances M and P, it is to be understood that the resistances M and P may be the movable elements and the contacts stationary.

The relation between filament current $(i)$ of the lamp and temperature $(T)$ may be expressed by the following equation:

$$\frac{1}{i} = a_0 + a_1\left(\frac{1}{T}\right) + a_2\left(\frac{1}{T}\right)^2 \quad (1)$$

where $a_0$, $a_1$ and $a_2$ are constants which will be different for different lamps.

It has been found that the quadratic curve represents the true relation between current $(i)$ and temperature $(T)$ more accurately than any individual calibration points.

If $(x)$ represents the displacement of the contacts along their respective slidewires M and P, the contacts being ganged to move together and the scale 18' is linear in mireds, then Equation 1 may be written in the following manner:

$$\frac{1}{i} = A + Bx + Cx^2 \quad (2)$$

where A, B, C are constants related to $a_0$, $a_1$ and $a_2$ and are determined by the four resistances L, M, N and P in the quadratic resistance network.

Referring to the explanatory circuit diagram in FIG. 4, it will be seen that the current $(i)$ entering the network divides into $i_1$ and $i_2$ so that the following voltage equality exists:

$$i_1[N+xP] = i_2[M+(1-x)P] \quad (3)$$

By substitution, it will be seen that:

$$i = i_1 + i_2 = i_2\left[\frac{M+(1-x)P}{N+xP}+1\right] = i_2\left[\frac{M+N+P}{N+xP}\right] \quad (4)$$

or $$i_2 = i\left[\frac{N+xP}{M+N+P}\right] \quad (5)$$

The voltage appearing at $(e)$ is $$e = iL + i_2 \cdot xM = i\left[L + \frac{xMN}{M+N+P} + \frac{x^2MP}{M+N+P}\right] \quad (6)$$

If $(e)$ is always maintained equal to a standard voltage $e_0$, then the following equation may be written:

$$\frac{1}{i} = \frac{1}{e_0}\left[L + x\frac{MN}{M+N+P} + x^2\frac{MP}{M+N+P}\right] \quad (7)$$

It will be recalled from Equation 2 that $A + Bx + Cx^2$ is also equal to $1/i$. Thus, Equations 7 and 2 are of the same form where $$A = \frac{1}{e_0} \cdot L; B = \frac{1}{e_0} \cdot \frac{MN}{M+N+P}; C = \frac{1}{e_0} \cdot \frac{MP}{M+N+P}.$$

As well understood in the optical pyrometry art, the pyrometer is supplied by the manufacturer with a standard lamp and a resistance for the network selected to provide proper calibration for that particular lamp. In optical pyrometers of the type disclosed herein, it is preferable to use lamps constructed in accordance with U.S. Patent No. 2,176,087. Lamps of this type are sold by Leeds and Northrup Company under Catalogue No. 13301-AQ-1. In one application with a standard lamp of this type the current-temperature relation was found to closely approximate the following expression:

$$\frac{1}{i} = -8.349 + 0.020003(1/T) + 27.790 \times 10^{-6}(1/T)^2$$

where $i$ is expressed in amperes and $1/T$ is expressed in mireds (reciprocal degrees Kelvin $\times$ $10^6$). The specific values in the foregoing expression are applicable only to this particular lamp and when other lamps are used, it is necessary to obtain such data from careful measurements of the lamp characteristics. The resistance values selected to match the foregoing relation with a pyrometer range of 1400° F.–2250° F. were $L = 17.524$ ohms, $M = 185$ ohms, $N = 19.795$ ohms and $P = 2.936$ ohms with $x = 0$ for a temperature of 2250° F. and $x = 1$ for $T = 1400°$ F.

As mentioned above in connection with FIGS. 1 and 2, it was pointed out that the amplifying device 20 might be of the solid state type. Such an arrangement is illustrated in FIG. 5. In FIG. 5, the modulator 25 is of the transistor type and includes a transistor 50 having a squarewave voltage applied to its base for alternately turning the transistor on and off. This will change the D.C. error signal on conductor 40 to one having an alternating component which is capacitively coupled through capacitor 26 to an amplifier 27 which includes two transistors 51 and 52. The output from the amplifier 27 is capacitively coupled through capacitor 28 to a demodulator 29 which includes a transistor 53. The transistors 50 and 53 are synchronously operated since they both receive their switching voltage from a common terminal of the multivibrator 24. As shown, the multivibrator 24 is of conventional type and includes transistors 54 and 55 having their bases and collectors cross-connected through capacitors 56 and 57 for alternately turning the transistors 54 and 55 on and off. A capacitor 58 is connected between conductor 40 and the multivibrator 24 for cancelling the switching voltage spikes capacitively coupled from the base of transistor 50 to its emitter. The integrator-amplifier 30, including transistors 59 and 60, converts the amplified signal into lamp current passing through the filament 12 of lamp 11.

In making the temperature measurement, the operator first closes the switch S which applies power from the battery 37 to the electrical circuit of the pyrometer including the filament of lamp 11. The switch S is usually on the telescope of the pyrometer, and, therefore, is readily operated when the operator sights the pyrometer on the target. If required, the operator will adjust the optical system to bring the image of the target under observation into the plane of the filament 12. The operator then adjusts the ganged contacts 17' relative to the respective slidewires M and P until the brightness or brilliance of the filament 12 matches that of the observed target image. The operator will then read the temperature directly from the scale 18' which, as mentioned above, may be calibrated in degrees or mireds. The quadratic resistance network, including the slidewires M and P and end-coil resistances L and N, is the same as previously described in connection with FIGS. 3 and 4 with the exception that the slidewire P has been shunted by a resistance $P_s$ to provide the desired resistance for that slidewire.

The optical pyrometer illustrated in FIG. 5 includes a provision for checking the battery similar to that described in FIG. 2. The switches 34 and 36 have been shown in measuring position and they are ganged and moved into contact with the battery-checking contacts BC when making a battery check.

From the foregoing description it will be seen that the present invention enables an operator to obtain the temperature reading by making a single adjustment rather than two adjustments as previously required by optical pyrometers of the type disclosed in Patent 2,252,015. The present invention while eliminating one adjustment, nevertheless retains the inherent accuracy obtainable with standard cells by comparing a voltage produced by the lamp filament current with the voltage of the standard cell. The present invention enables the operator to take more temperature readings within a given time than previously possible.

The present invention also enables the scale to be linear and thus permits the use of a vernier to obtain more precise readings as well as compensation for absorption by materials in the atmosphere between the pyrometer and the target. This latter feature is accomplished by offsetting the index with respect to the scale a predetermined amount when the scale is calibrated in mireds.

From the foregoing description it will be apparent that other variations may be made in the pyrometer within the scope of the present invention. For example, it is to be understood that without departing from the aforesaid quadratic relationship the resistance L in FIGS. 3-5 may be connected at the opposite end of resistance N. It is also to be understood that the slidewires M and P may be provided with mechanical stops to limit the upward movement of their respective contacts so that in effect there will be a resistance connected between the upper limits of travel of the slidewires. It will be apparent that while the invention has been described in connection with an optical pyrometer where the operator views the filament and the target and manually adjusts the instrument that such operation may be performed automatically by means of a conventional photo-cell to control an electric motor for making the adjustment automatically. The photo-cell would alternately view the filament and target with concurrent adjustment being made of the system by the motor until a brightness match is obtained.

What is claimed is:

1. An optical pyrometer system having a scale which is linear in a function of temperature for measuring the temperature of a target comprising a standard lamp including a filament having a quadratic relationship between the temperature of said filament and the current passing therethrough, a quadratic resistance network in circuit with said filament, said network comprising a first potentiometer resistance and contact movable relative thereto, a second potentiometer resistance and contact movable relative thereto, said potentiometer resistances being directly connected at one end thereof, a first resistance interconnecting the opposite ends of said potentiometer resistances to form a closed loop, a second resistance connected at one end thereof to the junction between said first resistance and said second potentiometer resistance, a pair of input terminals for introducing the current through said filament into said quadratic resistance network, a circuit connection between one of said input terminals and said contact of said first potentiometer resistance, a circuit connection between the other end of said second resistance and the other of said input terminals, a standard cell, means for comparing the voltage between said contact of said second potentiometer resistance and said other end of said second resistance with the voltage of said standard cell and varying the current through said filament to maintain said voltages equal, a scale and a relatively adjustable index, and means for simultaneously adjusting said contacts in the same direction relative to the common connection of said potentiometer resistances and said index relative to said scale until the brightness of said filament matches the brightness of the target for an indication of the temperature of the target on said scale.

2. An optical pyrometer system having a scale which is linear in a function of temperature for measuring the temperature of a target comprising a standard lamp including a filament having a quadratic relationship between the temperature of said filament and the current passing therethrough, a quadratic resistance network in circuit with said filament, said network comprising a first potentiometer resistance and contact movable relative thereto, a second potentiometer resistance and contact movable relative thereto, said potentiometer resistances being connected at one end thereof, a first resistance interconnecting the opposite ends of said potentiometer resistances to form a closed loop, a second resistance connected at one end thereof to the junction between said first resistance and one of said potentiometer resistances, a pair of input terminals for introducing the current through said filament into said quadratic resistance network, a circuit connection between one of said input terminals and said contact of one of said potentiometer resistances, a circuit connection between the other end of said second resistance and the other of said input terminals, a standard cell, and means for comparing the voltage between said contact of the other of said potentiometer resistances and said other end of said second resistance with the voltage of said standard cell, varying the current through said filament to maintain said voltages equal, a scale and a relatively adjustable index, means for simultaneously adjusting said contacts of said potentiometers in the same direction relative to the common connection of said potentiometer resistances and said index relative to said scale until the brightness of said filament matches the brightness of the target for indication of the temperature of the target on said scale.

3. An optical pyrometer system having a scale which is linear in a function of temperature for measuring the temperature of a target comprising a standard lamp including a filament having a quadratic relationship between the temperature of said filament and the current passing therethrough, a quadratic resistance network in circuit with said filament, said network comprising a first potentiometer resistance and contact movable relative thereto, a second potentiometer resistance and contact movable relative thereto, said potentiometer resistances being directly connected at one end thereof, a first resistance interconnecting the opposite ends of said potentiometer resistances to form a closed loop, a second resistance connected at one end thereof to the junction between said first resistance and said second potentiometer resistance, a pair of input terminals for introducing the current through said filament into said quadratic resistance network, a circuit connection between one of said input terminals and said contact of said first potentiometer resistance, a circuit connection between the other end of said second resistance and the other of said input terminals, means for maintaining constant the voltage between said contact of the other of said potentiometer resistances and said other end of said second resistance, a scale and a relatively adjustable index, and means for simultaneously adjusting said contacts in the same direction relative to the common connection of said potentiometer resistances and said index relative to said scale until the brightness of said filament matches the brightness of the target for an indication of the temperature of the target on said scale.

4. An optical pyrometer system for measuring the temperature of a body comprising a variable brightness standard for producing a brightness related to he electric current flow therethrough, adjustable calibrated potentiometric means including means adjustable relative to a scale, said potentiometric means being connected in a circuit with said standard in such a way as to produce an electrical output signal related to the electric current flow therethrough and to the setting of said potentiometric means relative to said scale, a source producing a standard electrical signal, and means responsive to the difference between said standard electrical signal and the signal output from said potentiometric means, the outputs of said potentiometric means and that of said standard source being connected to the input of said means responsive to the difference between said standard electrical signal and the signal output from said potentiometric means for controlling the current through said variable brightness standard and the potentiometric means to maintain the difference between said standard electrical signal and the signal output from said potentiometric means substantially at zero, whereby the temperature of said body is indicated by said scale when the brightness of said standard and the brightness of said body are equal.

5. A system for measuring the temperature of a body comprising a variable radiant energy standard for producing a radiant energy signal related to the electric current flow therethrough, adjustable calibrated potentiometric means including means adjustable relative to a scale, said potentiometric means being connected in a circuit with said standard in such a way as to produce an electrical output signal related to the electric current flow therethrough and to the setting of said potentiometric means relative to said scale, a source producing a standard electrical signal, and means responsive to the difference between said standard electrical signal and the signal output from said potentiometric means, the outputs of said potentiometric means and that of said standard source being connected to the input of said means responsive to the difference between said standard electrical signal and the signal output from said potentiometric means for controlling the current flow through said variable radiant energy standard and the potentiometric means to maintain the difference between said standard electrical signal and the signal output from said potentiometric means substantially at zero, whereby the temperature of said body is indicated by said scale when the radiant energy signal of said standard and the radiant energy signal of said body are equal.

References Cited

UNITED STATES PATENTS

| | | | |
|---|---|---|---|
| 2,252,015 | 8/1941 | Machler | 88—22.5 |
| 2,279,313 | 4/1942 | Hall | 323—79 |
| 3,051,869 | 8/1962 | Richards | 88—236 X |
| 3,066,251 | 11/1962 | Losher | 323—79 |
| 3,068,746 | 12/1962 | Vawter | 88—22.5 |

JEWELL H. PEDERSEN, *Primary Examiner.*

O. B. CHEW, *Assistant Examiner.*